US006836768B1

(12) United States Patent
Hirsch

(10) Patent No.: US 6,836,768 B1
(45) Date of Patent: Dec. 28, 2004

(54) METHOD AND APPARATUS FOR IMPROVED INFORMATION REPRESENTATION

(75) Inventor: Scott Hirsch, Jerusalem (IL)

(73) Assignee: Surfnotes, Jerusalem (IL)

(*) Notice: Subject to any disclaimer, the term of this patent is extended or adjusted under 35 U.S.C. 154(b) by 0 days.

(21) Appl. No.: 09/559,137

(22) Filed: Apr. 27, 2000

Related U.S. Application Data

(60) Provisional application No. 60/186,052, filed on Feb. 29, 2000, provisional application No. 60/169,744, filed on Dec. 8, 1999, and provisional application No. 60/131,249, filed on Apr. 27, 1999.

(51) Int. Cl.$^7$ .............................................. G06F 17/30
(52) U.S. Cl. .............................. 707/3; 707/2; 707/10; 707/103 R; 715/514
(58) Field of Search ............................. 707/3, 10, 100, 707/2, 5, 103 R; 715/513, 501.1, 514; 709/218; 717/146, 117

(56) References Cited

U.S. PATENT DOCUMENTS

| | | | | |
|---|---|---|---|---|
| 5,600,831 A | * | 2/1997 | Levy et al. ..................... 707/2 |
| 5,649,186 A | | 7/1997 | Ferguson ...................... 707/10 |
| 5,680,619 A | * | 10/1997 | Gudmundson et al. ..... 717/108 |
| 5,682,535 A | * | 10/1997 | Knudsen ...................... 717/117 |
| 5,708,825 A | | 1/1998 | Sotomayor ............... 715/501.1 |
| 5,721,908 A | * | 2/1998 | Lagarde et al. ............... 707/10 |
| 5,748,930 A | | 5/1998 | Prakash |
| 5,784,608 A | | 7/1998 | Meske, Jr. et al. .............. 707/2 |
| 5,842,206 A | | 11/1998 | Sotomayor ..................... 707/5 |
| 5,864,863 A | | 1/1999 | Burrows ................. 707/103 R |
| 5,884,035 A | | 3/1999 | Butman et al. ............. 709/218 |
| 6,085,186 A | * | 7/2000 | Christianson et al. ......... 707/10 |
| 6,102,969 A | * | 8/2000 | Christianson et al. ....... 717/146 |
| 6,243,723 B1 | | 6/2001 | Ikeda et al. ................. 715/514 |
| 6,289,334 B1 | * | 9/2001 | Reiner et al. .................. 707/3 |

FOREIGN PATENT DOCUMENTS

JP          10 320411        12/1998

OTHER PUBLICATIONS

Alexa Releases Amazon Shopping Tool, *The Search Engine Report*, Dec. 6, 1999.
Lycos Changes Listings Format, *The Search Engine Report*, Dec. 6, 1999.
Infoseek's earlier web interface showing Executive Summaries downloaded on Oct. 25, 1999 (www.go.cos) and infoseek's current web etc . . . (www.go.com/Center/Business_resources).
Atzeni, Paolo et al. (1997) "To Weave the Web" Proceedings of the 23rd VLDB Conference Athens, Greece pp. 206–215.
Bickmore, Timothy W. et al. (1997) "Digestor: device–independent access to the World Wide Web" Computer Networks and ISDN Systems 29 pp. 1075–1082.
Embley, D.W. et al. (1998) "A Conceptual–Modeling Approach to Extracting Data from the Web" Internet Article Online!, pp. 1–20 XP002181257.

* cited by examiner

*Primary Examiner*—Shahid Alam
(74) *Attorney, Agent, or Firm*—Stephen J. LeBlanc; Quine Intellectual Property Law Group, P.C.

(57) ABSTRACT

A information search and navigation system indexes, categorizes and condenses data from text or other documents. In various embodiments, the invention further can utilize user information goals, document or website types and multi-page link path options that together provide a fast, multi-page Web navigation system.

20 Claims, 12 Drawing Sheets

FIG. 4

← previous | next → (4 of 31 surfnotes) headlines read full web page

Free computer firm reboots after Apple mistake

Cnet News 15.2.2000

Key Facts ← 1 | 2 | 3 | 4 →

Under its business plan, qualified customers would get a free iMac if they agreed to a three-year Internet service provider (ISP) contract with EarthLink and agreed to accept advertising.

Key Numbers ← 1 | 2 →

Last year, the start-up announced that it intended to give away 1 million of the popular Apple iMac computers during the next two years.

Money

Strum subsequently upped the offer and said Freemac was willing to buy the computers at full retail price from retailers, which at the time was around $1,200 each.

Time Frames ← 1 | 2 | 3 | 4 →

The day after Freemac's highly publicized launch at an investment banking conference in San Francisco, Mitch Manditch, Apple's senior vice president of worldwide sales, called to tell Strum that Apple wasn't aware of the company, Strum said.

Key Companies

Apple : NadaPC.com : News.com : CNET : EarthLink

FIG. 5

← previous | next → (4 of 31 surfnotes) headlines read full web page

Free computer firm reboots after Apple mistake

Cnet News 15.2.2000

Key Facts ← 1 | 2 | 3 | 4 →

That ambition has died because Apple decided not to let Freemac buy any iMacs to give away, not even at full retail price, Strum told CNET News.com in an interview.

Key Numbers ← 1 | 2 →

"What we're telling our customers--well over a million people who signed up--is that Apple wont let you have a free computer," said Strum.

Money

Strum subsequently upped the offer and said Freemac was willing to buy the computers at full retail price from retailers, which at the time was around $1,200 each.

Time Frames ← 1 | 2 | 3 | 4 →

The day after Freemac's highly publicized launch at an investment banking conference in San Francisco, Mitch Manditch, Apple's senior vice president of worldwide sales, called to tell Strum that Apple wasn't aware of the company, Strum said.

Key Companies

Apple : NadaPC.com : News.com : CNET : EarthLink

FIG. 6

← previous | next → (4 of 31 surfnotes)   headlines   read full web page

Free computer firm reboots after Apple mistake

Cnet News                                                                 15.2.2000

Key Facts         ← 1 | 2 | 3 | 4 →

> That ambition has died because Apple decided not to let Freemac buy any iMacs to give away, not even at full retail price, Strum told CNET News.com in an interview.

Key Numbers       ← 1 | 2 →

> Last year, the start-up announced that it intended to give away 1 million of the popular Apple iMac computers during the next two years.

Money

> Strum subsequently upped the offer and said Freemac was willing to buy the computers at full retail price from retailers, which at the time was around $1,200 each.

Time Frames       ← 1 | 2 | 3 | 4 →

> As a recourse, Freemac is reinventing itself and will be relaunched later this month as "NadaPC.com" and will give away Internet access terminals instead.

Key Companies

> Apple : NadaPC.com : News.com : CNET : EarthLink

FIG. 7

← previous | next → (10 of 11 surfnotes)   headlines   read full web page

Proxim, Be Team On Wireless Networking

Advanced IP Services                                                      15.2.2000

Page Preview

> Proxim and Be are planning a joint technology and marketing effort to integrate Proxim's HomeRF wireless networking technology into Be's platform for Internet appliances. Proxim and Be plan to enable Internet appliances to distribute media and share broadband Internet access wirelessly in the home. Be said that should happen later this quarter.

Page Links

```
www.proxim.com/homerf.html
www.proxim.com/investors.html
www.proxim.com/contact.html
www.be.com
```

| Access A Plurality Of Atomized Notes Representative Of Source Content (Step B1) |
|---|
| Group Notes Into A Plurality Of Categories (Step B2) |
|---|
| Determine Type Of User Platform (Step B3) |
|---|
| Provide Control Inputs Allowing Access To One Or More Notes, Without Having To Review The Entire Source Content (Step B4) |
|---|
| Selected Notes Are Then Presented To The User (Step B5) |
|---|
FIG. 13

FIG. 16

Surfnotes - Sources:
Cnet News

| Headlines | | |
|---|---|---|
| Free computer firm reboots after Apple mistake | Feb 3, 2000 | Cnet News |
| Will Time Warner execs cash out on AOL merger? | Feb 3, 2000 | Cnet News |
| XML software firm latest entrant in IPO craze | Feb 3, 2000 | Cnet News |
| High-speed Net firms hunt for apartments | Feb 3, 2000 | Cnet News |
| Posts wider-than-expected loss but books profitable | Feb 3, 2000 | Cnet News |
| AT&T files for wireless tracking stock IPO | Feb 3, 2000 | Cnet News |
| Transmeta may file for public offering this year | Feb 3, 2000 | Cnet News |
| Reverse engineering could threaten RealNetworks | Feb 3, 2000 | Cnet News |
| eBay asked to pull KKK items from site | Feb 3, 2000 | Cnet News |
| Blocked students find backdoor to Napster | Feb 3, 2000 | Cnet News |

FIG. 17

Surfnotes - Company Insights:
Apple

| Headlines | | |
|---|---|---|
| Apple Unveils Mac OS X and Internet Strategy at Macworld | Feb 3, 2000 | Apple Hot News |
| Apple Unveils Internet Strategy | Feb 3, 2000 | Apple Hot News |
| Apple Board of Directors Announces CEO Compensation | Feb 3, 2000 | Apple Hot News |
| Free computer firm reboots after Apple mistake | Feb 3, 2000 | Cnet News |
| Apple and EarthLink Partner to Deliver Best ISP Service | Feb 3, 2000 | Apple Hot News |
| Apple Wins Imatec ColorSync Suit | Feb 3, 2000 | Apple Hot News |
| Apple Introduces AppleWorks 6 | Feb 3, 2000 | Apple Hot News |
| Apple Reports First Quarter Profit of $183 Million | Feb 3, 2000 | Apple Hot News |
| Top Computer Web Site | Feb 3, 2000 | Apple Hot News |
| New Indy Film & Music Channels | Feb 3, 2000 | Apple Hot News |
| QuickTime TV Network Scores Super Bowl Touchdown | Feb 3, 2000 | Apple Hot News |
| Industry Leaders Rally to Support Mac OS X | Jan 5, 2000 | Apple Hot News |
| Apple Unveils Mac OS X | Feb 3, 2000 | Apple Hot News |

FIG. 18

Cnet News
Headlines

| | | |
|---|---|---|
| Free computer firm reboots after Apple | Feb 3, 2000 | Cnet News |
| Will Time Warner execs cash out on AOL | Feb 3, 2000 | Cnet News |
| XML software firm latest entrant in IPO | Feb 3, 2000 | Cnet News |
| High-speed Net firms hunt for | Feb 3, 2000 | Cnet News |

The Standard
Headlines

| | | |
|---|---|---|
| McCain Rides the Internet Tax Issue | Feb 1, 2000 | The Standard |
| Ship It to Me, Valentine | Feb 2, 2000 | The Standard |
| Stocks See Shadows, Pay No Mind | Feb 3, 2000 | The Standard |
| Clinton's Bridge Across the Digital Divide | Feb 2, 2000 | The Standard |

CNN
Headlines

| | | |
|---|---|---|
| GM taps new CEO | Feb 2, 2000 | CNN |
| 'Cyber defense' not valid in Columbine | Feb 2, 2000 | CNN |
| The final minutes of Flight 261 | Feb 2, 2000 | CNN |
| Up for auction: passport used in spy | Feb 1, 2000 | CNN |

Red Herring
Headlines

| | | |
|---|---|---|
| States Debate School Voucher Plans | Jan 31, 2000 | Red Herring |
| Who will buy Buy.com? | Feb 3, 2000 | Red Herring |
| Online grocers still shopping for dollars | Feb 2, 2000 | Red Herring |
| Lintel hopes to supplant Wintel | Feb 3, 2000 | Red Herring |

FIG. 19

Telecommunications
Headlines

| | | |
|---|---|---|
| IR, TI fine-tune power-management | Jan 31, 2000 | Microwaves & Rf |
| Lithography advances hinge on 157-nm | Feb 3, 2000 | Microwaves & Rf |
| Looking to Grab A PC of the Action | Jan 5, 1999 | Tele.Com |
| Nortel CEO outlines 'second wave' of e- | Feb 3, 2000 | ZDnet |

Software Programming
Headlines

| | | |
|---|---|---|
| reports on Red Hat's partnership with | Feb 3, 2000 | Linux Daily |
| Sprint Goes To Hollywood | Jan 27, 2000 | Advanced IP Services |
| Study: Net sparking IT spending spree | Feb 3, 2000 | Advanced IP Services |
| Gig Ethernet Reaches Across WAN | Jan 28, 2000 | Advanced IP Services |

Investing and Finance
Headlines

| | | |
|---|---|---|
| ICGE: A Month to Remember!? | Feb 3, 2000 | Internet Stock Report |
| Dow Ends Down, Nasdaq Up After Rate | Feb 3, 2000 | Morningstar |
| BBC Gets U.S. Resources | Feb 3, 2000 | The Daily Deal |
| Mixed Signals in Taiwan's Telecom | Jun 2, 1999 | The Daily Deal |

Internet
Headlines

| | | |
|---|---|---|
| Lawsuit claims AOL 5.0 blocks rival | Feb 3, 2000 | Aardvark Daily |
| Free computer firm reboots after Apple | Feb 3, 2000 | Cnet News |
| Will Time Warner execs cash out on AOL | Feb 3, 2000 | Cnet News |
| Ad Dollars Flow to Vortals | Feb 2, 2000 | Internet Advertising |

METHOD AND APPARATUS FOR IMPROVED INFORMATION REPRESENTATION

CROSS REFERENCE TO RELATED APPLICATIONS

This application claims priority from the following patent applications, each of which is incorporated herein by reference:

60/186,052 filed Feb. 29, 2000;

60/169,744 filed Dec. 8, 1999;

60/131,249 filed Apr. 27, 1999.

FIELD OF THE INVENTION

The present invention is related to the field of representing and accessing information. More specifically, the present invention is directed to a method and/or apparatus for effectively organizing displaying information using a PC or non-PC information appliance such as a cell phone, other intelligent telephone, Personal Digital Assistant, information-enabled television (WebTV), etc.

BACKGROUND OF THE INVENTION

A number of techniques have been proposed and developed to use logic devices or information appliances to index, search, annotate, and access information. The need for such techniques has increased dramatically with the advent and increased use of the WWW and extensive data banks of information available on private networks (intranets) or storage devices (such as memory or readable media such as DVD, disks or CDs).

In addition, the expected growth in smaller screen, non-PC information appliances to access the Internet or other information sources will outdate typical methods for accessing information today. For example, many users access or find information on the web using a search engine (such as Altavista, Excite, Google, Lycos, Infoseek, etc.) or through an index list (such as Yahoo). While these services have given tens of millions access to information on the WWW, there are a number of known shortcomings. Generally, all of the services work by providing a listing of sites in response to user input. This listing may include just the name of the sites or may include the name and some additional information, such as the title, the first line of text, and/or some line of text in context with the search word. If the user wishes to learn additional information about a site, the user indicates the URL from the site list and opens the first page of the site. However, depending on the design of the site, the user may have to access several different pages and view or hear a substantial amount of text in order to find information of interest.

In cases where a user is on a small display device, such as a cell phone with a display or a PDA or audio device, opening a web site to scan and locate information of interest can be very difficult. In addition, accessing sites through typing in a URL is not practical for small screen, handheld devices. Reformatting websites for such devices generally requires a content publisher to perform an entire reformatting of web sites or pages specifically for a small screen device.

Some more recently developed technologies have attempted to present web pages to users with additional information.

InXight is designed to present a list of web pages and to display an executive summary to the right of the list when a mouse is placed over a listed URL.

AvantGo and other companies offer "Web Clipping" which is a way for publishing in text-only format that will fit on a Personal Digital Assistant. This service works as a means for re-publishing/re-formatting content for the new devices.

IBM's Intelligent Miner technology classifies organization types and people found in documents and gives standard long summaries of pages.

PassCall (additional information available at http://www.passcall.com/)and others take existing Web pages made for PCs and determine how to display the entire content (i.e. all of the text) of a webpage on a cell phone.

What is needed is a method and/or apparatus that will allow users to quickly review content sources to find information of interest.

Prior Patents

Several prior patents have been located that may be related to the invention or may provide background information. Listing of these patents here should not be taken to indicate that any formal search has been completed or that any of these patents constitute prior art. Discovered patents include:

U.S. Pat. No. 5,864,863 (Burrows), Method for parsing, indexing and searching World-Wide Web pages;

U.S. Pat. No. 5,884,035 (Butman, et al.), Dynamic distributed group registry apparatus and method for collaboration and selective sharing of information;

U.S. Pat. No. 5,842,206 (Sotomayer), Computerized method and system for qualified searching of electronically stored documents;

U.S. Pat. No. 5,748,930 (Prkash), Method and apparatus for interfacing with a host computer system sharing tasks with another user on a client computer system;

U.S. Pat. No. 5,708,825 (Sotomayer), Automatic summary page creation and hyperlink generation;

U.S. Pat. No. 5,649,186 (Ferguson), System and method for a computer-based dynamic information clipping service.

SUMMARY

The present invention is involved with organizing information or content in a way that provides new features to a user and that allows for effective user access from different devices with different device characteristics.

In specific embodiments, information can include Web pages or Web sites. Information can also include other information that is stored, transmitted, or presented via a computing device or information appliance, such as a PC, cell phone, Web TV or other information appliance or browsing device.

In further specific embodiments, according to other aspects of the invention, the information organization paradigm of the present invention provides an effective mechanism for storing a pre-browsed and concise summary of information available in hyperlinked format.

In further specific embodiments, and according to other aspects, the information paradigm of the present invention is involved with an independently innovative system for automatically extracting summary notes from information sources in a way that allows presentation in a flexible manner.

In further specific embodiments, and according to other aspects, the information paradigm of the present invention is involved with an independently innovative system for improving user searching by searching in extracted information notes rather than in raw source documents.

In further specific embodiments, and according to other aspects, the information paradigm of the present invention allows mock surfing or presurfing of extending information by automatic link surfing.

In further specific embodiments, and according to other aspects, the information paradigm of the present invention allows grouping extracted notes into folders for easier user access.

In further embodiments, the paradigm of the present invention may be used along with other innovative components to enhance searching, automatic parsing, pre-browsing of linked documents, etc. These additional and independent innovative components are not necessary for operation of the invention as just described and will not be present in all embodiments.

The invention and various specific aspects and embodiments will be better understood with reference to the following drawings and detailed descriptions. In different figures, similarly numbered items are intended to represent similar functions within the scope of the teachings provided herein. In some of the drawings and detailed descriptions below, the present invention is described in terms of the important independent embodiment of a system operating on a data network. This should not be taken to limit the invention, which, using the teachings provided herein, can be applied to other situations, such as cable television networks, wireless networks, etc. For purposes of clarity, this discussion refers to devices, methods, and concepts in terms of specific examples. However, the invention and aspects thereof may have applications to a variety of types of devices and systems. It is therefore intended that the invention not be limited except as provided in the attached claims.

Furthermore, it is well known in the art that logic or digital systems and methods can include a wide variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative embodiment in this specification.

The functional aspects of the invention, as will be understood from the teachings herein, may be implemented or accomplished using any appropriate implementation environment or programming language, such as C++, Cobol, Pascal, Java, Java-script, ActiveX, dynamic HTML, COM, etc.

All references, publications, patents, and patent applications cited herein are hereby incorporated by reference in their entirety.

BRIEF DESCRIPTION OF THE DRAWINGS

FIG. 4 illustrates an example display of a number of notes after selecting a different note under a first category.

FIG. 5 illustrates an example display of a number of notes after selecting a different note under a second category.

FIG. 6 illustrates an example display of a number of notes after selecting a different note under a third category.

FIG. 7 illustrates an example display of a page preview note.

FIG. 13 illustrates a general method for providing content that can be presented on a wide variety of presentation platforms.

FIG. 16 illustrates an example display showing a number of note sets in a source folder.

FIG. 17 illustrates an example display showing a number of note sets collected under a company insights folder.

FIG. 18 illustrates an example display showing four news source folders, each with a number of note sets.

FIG. 19 illustrates an example display showing four folders, each grouped by topic, with a number of note sets.

DESCRIPTION OF SPECIFIC EMBODIMENTS

Figure 1:
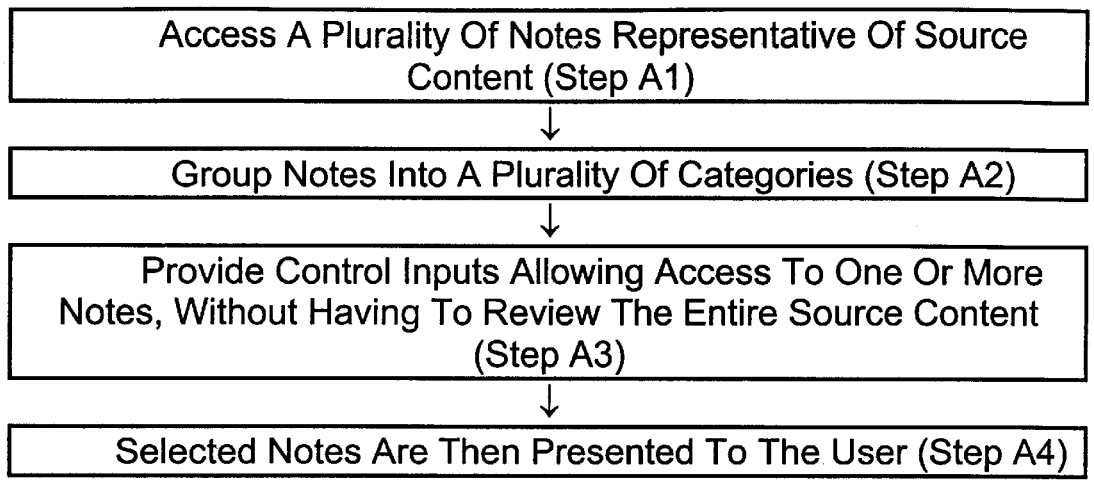
FIG. 1 illustrate a general method for interactive content access according to an embodiment of the invention.

In order to facilitate description, the following discussion will describe the present invention primarily in terms of accessing information from Web pages or sites available over the WWW. It will be understood to those of skill in the art from the teaching provided herein, however, that the invention also may be used to access sets of data, such as data stored on a private network, or on a disk drive, CD, DVD, tape, or other storage media. The invention should therefore not be taken as limited except as provided in the attached claims.

Glossary of Terms

Unless the context requires otherwise, the following terms can be understood to generally have the meaning indicated below when used herein.

Category—as used herein, refers to a category determined for a unit of data for a note. Categories may be such things as Key Fact, Money, Company, Timeframe, Key Number, etc. A single source may be extracted into several discrete items of information (notes), with each note associated with one or more categories. Using different terminology, a category can also be referred to as a field or field name, as is known in the database art.

Classification—a general class or type associated with a source or content, which in some specific and independent embodiments may be performed automatically and in other embodiments may be assigned manually. Classification of a source may (but need not) be performed in conjunction with extracting notes from a source. In specific embodiments of the invention, classification of a source may influence the extracting into notes and the analysis performed during extracting into notes may assist classification. Classification of a source may aid automatic parsing of a site by providing a different collection of parsing rules. For example, a sites classified as News Services often will have very different formatting and parsing considerations that sites classified as Company Website.

Folder—a collection of notes or of Surfnotes from one source or many sources for quick viewing grouped by source, topic, search term or other item.

Note—An item of data extracted from a source. Notes may consist of a single word or name, a sentence, a group of sentences, and/or other items from a source such as a URL, image, or audio or video clip. Using different terminology, notes may also be referred to as values.

Source—raw, unextracted information, documents, websites, webpages, or other data, to which the extracting and/or classification techniques of the present invention are applied. This information may be formatted in HTML, as text documents, or other formatting. Source an also indicate a locator (such as a citation or URL) for that information. Also referred to as content.

Surfnote—Surfnote™ is a trademark name referring to a particular branded process for creating an extracted or summary note. Surfnote, as a noun, may also refer to a set of extracted notes by such a branded process.

Template—an indication of how to present information to a user. The template may change based on user request or purpose or based on the particular access device. For example, a user purpose indicating a request for price information, may present only notes related to price or may place such notes above other notes. While a different user, accessing the same content, with a selected user purpose of locating potential customers, might not access price notes at all and may instead access customer addresses ahead of other notes. As a further example, a template on a very small display device (such as a cell phone) may only display one note at a time or a present a very few choices, while a viewer on a larger display may see many notes. In various embodiments, templates may be used by a server-side process to influence the format and content downloaded to a particular client or by client-side processes to arrange and present received notes data.

1. Organizing and Accessing Content

In a specific embodiment, aspects of the invention can be understood as a new way of organizing information. One advantage of this new information paradigm is to facilitation flexible presentation or access of information. In further aspects, specific embodiments of the invention enable easy and consistent navigation on different presentation devices, including various sized display screens or audio access devices. Display screens can be small, such as for a cell phone, medium, such as for a PDA, or a large such as for a PC. Other presentation devices can include audio interfaces for use over a telephone or for sight-impaired persons. The notes techniques of the present invention can also be used to extract information that may be imported directly into other documents or logic modules, such as databases, spreadsheet programs, or documents.

For the purposes of this discussion, the information organization techniques and devices of the present invention will be described with reference to particular information presentations. It will be understood from the teachings herein, however, that the present invention encompasses the underlying innovative techniques for organizing and categorizing information sources that make the illustrated displays possible.

According to the present invention, underlying information content may be presented as categorized, summary notes. In specific embodiments, a note is associated with a category. In one embodiment, each note may be a numbered entry in its particular category. Each note in each category is a piece of information from an underlying source. Underlying sources can include documents, web pages, a number of hypertext linked pages, databases, web sites, a number of sources returned in response to a request or query, etc. In specific embodiments, note text is quoted directly from the original source, thus avoiding problems that can arise when a summarizer attempts to translate or paraphrase original content. For sentence notes, the entire sentence is pulled off the page and placed in the appropriate category. It has been determined that selecting entire key sentences provide a surprisingly good representation of an entire page through rules applied according to the invention. Notes can contain sentences, words, graphics, or playable files, each extracted from an underlying source according to one or more methods. In various specific embodiments, notes may be extracted from sources in a variety of ways, including, but not limited to: manual summary, specific indications or tags placed in sources, or entirely or in part by using an automatic rules-based parsing.

FIG. 1 illustrate a general method for interactive content access according to an embodiment of the invention. As shown in the figure, an interactive presentation method according to the invention accesses a plurality of notes (Step A1) that are representative of source content. Notes are grouped into a plurality of categories (Step A2). A user is provided control inputs allowing the user to access one or more notes, without having to review the entire source content (Step A3). The user selected notes are then presented to the user (Step A4).

Together, as will be apparent from the teachings herein, notes provide an abstract or summary of the underlying content that can be effectively accessed by a user, in a similar manner, on display screens of widely varying size or different presentation devices. Thus, the information handling of the present invention allows a user interface that provides similar and familiar interactions for a user on very different devices. This display and content organization paradigm of the present invention further, in specific embodiments, allows for a highly granular and interactive display of source content.

1.1. Example Display 1

Figure 2:
FIG. 2 illustrates an example display of a number of notes.

An example display according to a specific embodiment of the invention is shown in FIG. 2. This example may be understood as a display of a part of a set of notes showing a number of different notes in a number of different categories and providing user-selectable indications directing display of additional notes or directing display of other content. This display is illustrated to both illustrate the presentation aspects of the present invention and the underlying information representation techniques of the present invention.

FIG. 2 shows display of four individual sentence notes 10, in different categories 12. Also shown are non-sentence notes 14 indicating company names. In this example, illustrated categories include: Key Facts, Key Numbers, Money, Time Frames, and Key Companies. According to various embodiments, notes (which also may be referred to as category values) 10 may be non-selectable display text, as indicated by the unbolded sentences, or selectable text, as indicated by the bolded company names, which may link a user to further information.

Figure 3:
FIG. 3 illustrates an example of underlying source content.

According to the invention, notes such as shown in FIG. 2, are associated with a underlying content source, such as shown in FIG. 3. In specific embodiments, this underlying content source may be made easily accessible by providing a link on a note display, such as 18. A common underlying content source for a set of notes will be a single document, such as shown in FIG. 3, which illustrates a display of an HTML page. However, as will be understood from the teachings herein, an underlying source for a note set may be an entire website, or could be a number of documents grouped together for some reason, such as because they were the results of a search. A source could also be a database or non-HTML document, such as a document encoded in WORD, ASCII, or any other computer readable format.

As discussed above, notes as shown in FIG. 2 may be derived from a source such as FIG. 3, by a variety of methods, including partially manual summarization and a variety of automatic or semi-automatic methods. A particular system and method for automatic extraction of notes from source content according to further aspects and embodiments of the present invention is described below. The combination of automatic parsing and the innovative organization paradigm taught herein provides powerful additional benefits for accessing content. However, the interactive display mechanism of the present invention can be used with other content summarization methods, including manual searching.

1.2. Categories

A notes system according to the invention may have many more categories that will operate in similar fashion to the categories shown in FIG. 2 and that may be variably accessed according to different templates or different user requests. Categories may be defined that are particularly applicable to certain professions, information sources, or user purposes. Medical content, for example, might include such categories as Pharmaceuticals, Symptoms, Diseases, Treatments, Outcomes, etc. Consumer content, for example, might include such categories as Reviews, Price, Warranty, Shipping, etc.

A system according to the invention may have many more categories that will operate in similar fashion to the categories shown in these figures and provide additional types of content from web pages. Different views composed of different categories are dynamically presented to users based on user requests or on the content of the page.

For different structured sources, categories can change as well. For example, on a news story, there may be several categories such as: source, key facts, key numbers, etc., while on a small page there may be only three categories of surfnotes: source, short text(page preview) and page links.

Systems according to various specific embodiments of the invention can display one category at a time across several web pages or sites or multiple categories per page that are best suited to the page or are based on a user's preferences. Within the categories can be 0, 1, or multiple entries. Users can change presentation preferences on category basis by not displaying certain categories, changing the order of category display, only displaying certain categories, etc.

Which categories are associated with a particular content may be determined or indicated manually for a source, or may be determined during site classification or content parsing according to further aspects of the invention as described below.

1.3. Example Interactive Navigation

According to a further embodiment, a display according to the invention includes user selectable indications to provide enhanced interactive presentation. Among these are notes navigation indications 16. These navigation indications can take a variety of forms in different embodiments, such as buttons, icons, arrows, etc., but illustrated in this figure is an arrangement of selectable numbers that indicate a number of a current. note in a category, indicate a total number of notes, and allow a user to display a next note, a previous note, or a specifically numbered note.

In one embodiment, for example, a user may indicate either the "2" or the next arrow (→) just to the right of "Key Facts" to display the next note in that category, as shown in FIG. 4. Similarly, a user could indicate an appropriate arrow or number to display additional "Key Number" or "Time Frames" notes as shown in FIG. 5 or FIG. 6. Indications can be accomplished by a mouse or pen click in a computer display, or a voice or keypad input as discussed in more detail below. Indications for a next note could also be activitated by clicking the note text itself is specific implementations.

FIG. 2 through FIG. 6, and related figures, illustrate how a user might interact with a content presentation according to specific embodiments of the invention. Note that in response to user selection (or automatically, in some embodiments, after a time interval) various notes are presented under different categories. According to specific embodiments, these notes may be presented in one-sentence increments; if multiple notes relating to a category appear on the page, the display may indicate this by displaying numbered and arrow tabs to the right of the category title, which allow the users to view additional notes in that category. As a further option, not shown in the display of FIG. 2, a display may indicate that other categories of notes are available and allow a user to select presentation of other notes categories.

In a particular embodiment of the invention, a user may select to view just one next note, and that next note is displayed while other information on the display remains static. In a different embodiment of the invention, an indication may be provided that causes a display of a next note (when available) in all displayed categories.

FIG. 2 further shows display of notes that are themselves links, such as, in this example, the "Key Companies" notes. A user selecting one of these notes will activate additional access related to these notes, such as a company webpage, a company information document provided by a third-party (such as Dunn and Bradstreet), or additional content such as links related to that company. In a similar fashion, selectable notes may be used to access non-text content, such as image, video, or audio files.

As will be understood from the teachings provided herein, a wide variety of different display and interactivity options are possible in accordance with the content organization and access paradigm of the present invention.

The particular example shown in FIG. 2 further includes a display of: the headline or title of the source document; an identification of the source of the document; and a date associated with the document. According to a specific embodiment of the invention, in which note sets may be organized in folders, some of these display items and other display items illustrated in FIG. 2 allow folder navigation, as described in further detail below.

A title area 20 displays a title from the source 21, a source identification 22, and the date of publication 23.

1.4. Example Display 2 (Cellphone Display)

FIG. 7 illustrates an example display of a page preview note. According to specific embodiments of the invention, information is interactively displayed on such a display in a similar manner as on a PC, with variations due to the different nature of the display. For example, notes may be displayed one after another on a small screen display, and in a specific embodiment, with each note numbered.

Figure 8A:
FIGS. 8A and 8B show a first "Key Fact" note display on a small display screen (such as a cellphone) and a "page down" continuation of that display on a small display screen.
Figure 8B:
Figure 9:
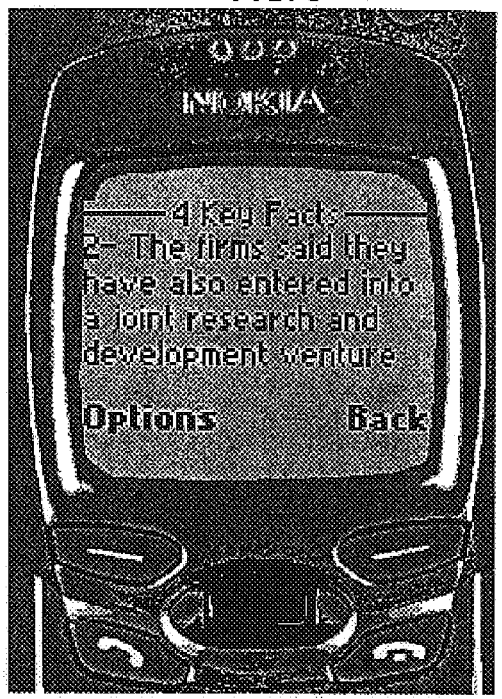
FIG. 9 shows a second "Key Fact" note display on a small display screen.
Figure 10:
FIG. 10 shows a display allowing a user to select a next category of notes on a small display screen.
Figure 11:
FIG. 11 shows a "Key Number" note display on a small display screen.
Figure 12:
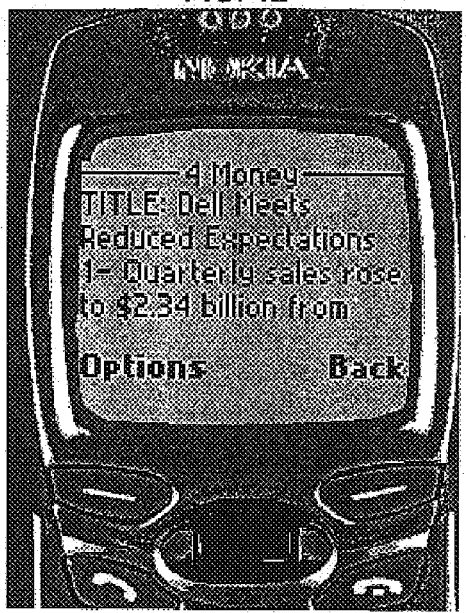
FIG. 12 shows a "Money" note display on a small display screen.

FIG. 8A shows the beginning of a display of a first Key Fact note. FIG. 8B shows a continuation of that display of that note, which has been viewed by scrolling downwards on the screen, using any scroll down control provided by the display device. FIG. 9 shows the display of a second Key Fact note, which has also been accessed viewed by continued scrolling downwards using a scroll indication (such as a button) on the cell phone. In this example embodiment, the top of the screen continuously displays the number of entries for that category and the category name. FIG. 10 shows a display allowing a user to select a next category of notes on a small display screen. Note that in FIG. 10, different category names are shown allowing for selection of different sets of notes to be displayed. Thus, at the end of the category's display, if there are more categories in the note set, the interface displays links that lead directly to those categories. In specific embodiments, within a note set, key sentences are displayed one category at a time, with each sentence numbered. A dividing line may be used to separate each entry.

1.5. PDA Display

From the previous teachings, it will be understood to those of skill in the art that the information organization paradigm of the present invention provides a way for interactively presenting information that is adaptable to both a relatively large screen display (such as a PC), a very small screen display (such as a cell phone) and also to a medium screen display, such as a personal digital assistant (PDA). Depending on available display size, a PDA display for a larger screen size may be presented similar to the illustration of FIG. 2, but displaying fewer notes from fewer categories. For smaller screen PDAs, the display may be handled similarly to display on a cell phone as shown in FIG. 8.

1.6. Facilitating Multi-Platform Presentation

FIG. 13 illustrates a general method for providing content that can be presented on a wide variety of presentation platforms. As shown in the figure, an interactive presentation method according to the invention accesses a plurality of atomized notes (Step B1) that are representative of source content. Notes are grouped into a plurality of categories (Step B2). A determination is made regarding a user's presentation platform (Step B3). Content and control inputs are formatted according to that presentation platform and downloaded to a user (Step B4), allowing the user to access one or more notes without having to review the entire source content (Step B5). The user selected notes are then presented to the user (Step B6). As will be apparent to those of skill in the art from the teachings provided herein, the content organizing and display paradigm provides a highly flexible user interface for content, but one that allows a user interface that will be familiar, even on very different presentation platforms.

As a further example of an application for information organizing and presentation according to the present invention, the present invention has unique advantages for interactively presenting data formatted for the Internet in a audio format, either over a voice-enabled networked information appliance or a standard telephone. The general method illustrated in FIG. 1, for example, may directly be adapted to a audio play back system, where user indications are entered either through voice commands or a keypad.

Because of the granular nature of the data organization and presentation paradigm according to the invention, a user easily learn, via voice communication, that a content source has, for example, 34 notes, in five categories. The user can then, through voice commands or keypad selection, elect to hear subsets of information of interest, such as "all notes in the third category," or "first note in each category." Thus, it will be seen that the notes paradigm according to the invention provides a method that allows similar and easily access to information content, whether viewed on a display or accessed over a telephone. Standard content formatting (such as HTML) does not provide this feature and is not easily adapted to lower bandwidth presentation channels. When the display and organization paradigm described above is combined with automatic parsing, as discussed below, the invention can provide a mechanism for effectively presenting content formatted in a static, large-display, format (such as HTML) and presenting such content over a voice link.

1.6.1. Templates

In a further embodiment, the invention may use a set of templates to determine presentation of notes information to a user. Templates may be used to guide presentation of a single note set on various access devices or may be used to alter presentations in response to user preferences or selected user purposes. Through use of templates, a presentation system according to the invention may present a set of notes in a wide variety of presentation formats.

1.6.2. Page Preview

As an example of an alternate presentation, in further embodiments, when a source document contains very little text, or text with non-substantial content, or is a preliminary page guiding the viewer to further content—a display according to the invention can present a different view of the content. Such a view, for example, may show just the important links displayed on the Web page and a Page Preview (as shown in FIG. 7) as an optimal way of summarizing the page. Instead of categorized key sentences, the Page Preview displays a set amount of text from the web page. A page preview may also be represented in the system as a note in a category called Short Text

1.7. Implementation of Interactive Presentation

From the teachings provided above, it will be apparent to those of skill in the art that there are a number of possible ways of implementing an interactive display according to the invention and a number of possible ways of implementing an underlying data organization paradigm according to the invention. One particularly presentation system advantageous method involves using extended HTML with embedded active controls, included undisplayed text. In such an implementation, a single downloaded file, for example, can include all or a large subset of available notes, even though only a portion of the downloaded notes will be displayed at any one time. In this way, a user interacting with a presentation interface, such as shown in FIG. 2, can quickly select various notes for display, and those notes will already be present at a display machine and may be quickly accessed. An interactive display according to invention also may download some notes items only when selected by a user. An interactive display may also be implemented in a variety of other programming environments, such as Java, ActiveX, COM, or dynamic HTML.

A data paradigm according to the invention can be implemented in any general purpose programming language, such as C, $C^{++}$, FORTRAN, PASCAL, JAVA, etc., or in any programming language able to represent data, such as SQL, ACCESS, etc.

1.8. Further Embodiments

Innovative methods and systems both for organizing and for presenting content have therefore been described. From the preceding teachings, it will be seen that this content organization method has advantages for presenting content on a variety of devices, using a similar user interface. The invention has thus far been described in terms of general methods and specific examples of presentation devices. The previous description is believed sufficient to allow an ordinary practitioner in the art to make and use the invention. It will be understood to those of skill in the art from the teachings provided herein that the described invention can be implemented in a wide variety of specific programming environments and logical systems (such as UNIX, Windows, Solaris, Oracle, etc.) using a wide variety of programming languages (such as HTML, SQL, Visual Basic, Pascal, C++, Basic, Java, etc.) and wide variety of file formats.

What follows are descriptions of further innovative features and methods that may be included in a specific system or method according to the invention. This following discussion is included, in part, in order to disclose particularly preferred modes presently contemplated for practicing the invention. This following discussion also includes independently innovative devices and methods that may advantageously used in combination with a content organization and display system as previously described. It is intended, however, that the previous discussion represents an independently innovative embodiment of the invention and that the claims not be limited by additional elements described below, except where expressly provided. It is further intended that the attached claims be read broadly in light of the teachings provided herein. Where specific examples are described in detail, no inference should be drawn to exclude other examples known in the art or to exclude examples described or mentioned briefly from the broad description of the invention or the language of the claims. It is therefore intended that the invention not be limited except as provided in the attached claims and equivalents thereof.

2. Folders

In a further embodiment, the invention provides a method for organization multiple note sets into folders. While folders are not necessary to practice the invention, folders can create additional convenience for users to access or organize note sets. Note sets may be grouped automatically or manually into folders according to such characteristics as their source, the topic of the page, or a search result. A system according to the invention can also allow a user to save a note set into a folder.

Returning to FIG. 2, the example display indicates in this embodiment that there are 31 total note sets available in a current folder and that FIG. 2 is a display of part of the fourth note. Depending on the particular embodiment, as will be further understood from the teachings herein, these 31 note sets could represent such things as: 31 hits on information sources (such as web sites or web pages) retrieved by a search; 31 notes sets manually stored in a folder; 31 documents retrieved from a database; 31 scheduled documents delivered via email; etc.

FIG. 16 illustrates an example display showing a number of note sets in a source folder. FIG. 17 illustrates an example display showing a number of note sets collected under a company insights folder. An example multi-folder display is shown in FIG. 18, showing a number of different folders grouped by source. In each folder, there are entries represented by several pieces of information including the headline/title, the date the article was published, and the source. In this example, each entry represents a note set. In this embodiment, the headline/title and source are each separate, active links—the user can click on the headline/title to view a note set, or can click on the source to jump to the folder listing notes for that source, as shown in FIG. 16.

Folders further may provide a user with a series of browsing choices from which the user may choose, such as, Today's News, Topic, Source, or Company Insights. Each choice indicates a method of browsing the note sets by grouping according to different folder categories. "By Topic" allows a user to see notes of articles from various internet sources, grouped according to topic. "By Source" displays lists of notes grouped by their source. "Company Insights" displays lists of notes grouped according to company mentioned in those notes.

Figure 20:
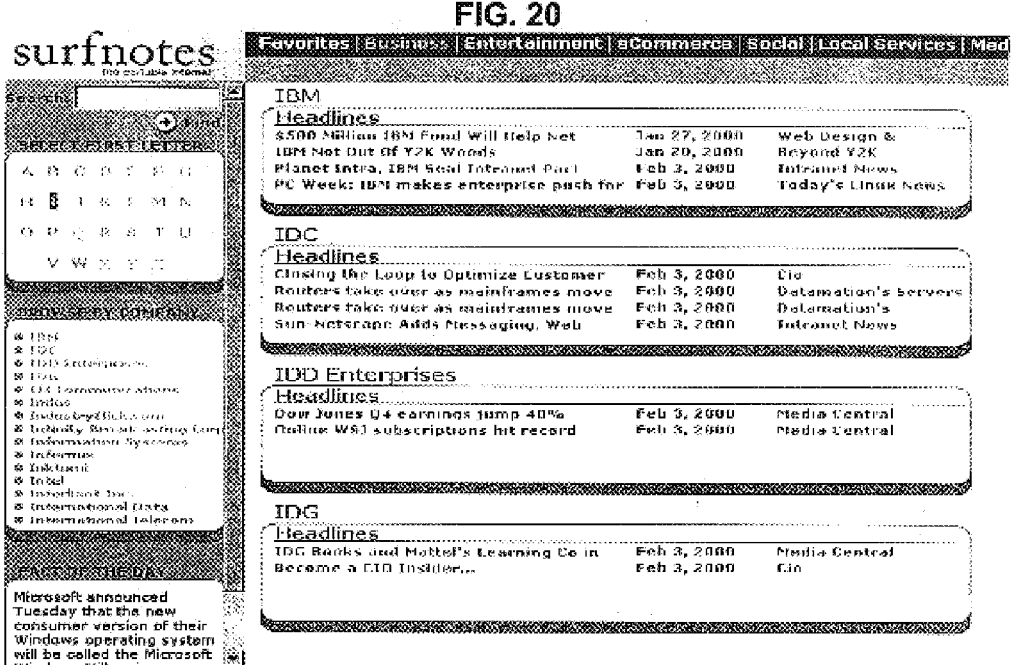
FIG. 20 illustrates an example display showing four folders, each grouped by company, each with a number of note sets and showing additional optional navigation controls.

In a further specific embodiment, Topics, Sources and Company names in Company Insights appear in alphabetical order. For Sources and Company Insights, a left-margin alphabet menu bar can allow a user to skip ahead in the alphabet to folders beginning with any letter, and another menu box lists all folders beginning with that letter. For Topics, a left-margin menu box lists all topics in alphabetical order. A user can click on any entry in the left-margin menu boxes to jump directly to those folders. The main screen only displays about four folders at a time. Each folder initially displays up to four headlines or titles of note sets—if there are more note sets in the folder, the user can scroll up or down using scroll arrows at the bottom of the folder. An example is shown in FIG. 20.

In a further embodiment, folder navigation options may be presented on a default display for a particular template. For example, FIG. 2 shows a number of options for folder navigation, including option 24, which may be used to indicate a folder (in this case "Headlines") and allow a user to open that folder for accessing the title (or other indications) of all available notes sets. Prev/Next Tabs 26 allow the user to view previous or next note sets within the folder currently in use. A Dynamic Source Link 22 allows a user to view available note sets for the source from which this note set came. An example result is shown in FIG. 16.

Figure 21A:
FIGS. 21A and 21B show a folder display on a small display screen (such as a cellphone) and a "page down" continuation of a folder display on a small display screen.
Figure 21B:

As with note sets, organizing content into folders enables easier display on very small screen devices and other presentation platforms. Navigation of folders on a cell phone is also menu-driven—the user chooses a browsing method (Today's News, Company Insights etc,) and that choice displays the relevant alphabetized menu of folder choices. Based on user choices Surfnotes displays a folder as a list of numbered headlines, which can be selected to view the relevant note sets. FIGS. 21A and 21B show a folder display on a small display screen (such as a cellphone) and a "page down" continuation of a folder display on a small display screen.

3. Automatically Parsing Source Content to Extract Notes

In further specific embodiments, a method or system according to the present invention may involve intelligently and automatically extracting information from HTML pages or other content (such as documents encoded in ASCII, MS Word, RTF, etc.) using a variety of automatic parsing rules. This aspect of the present invention, as discussed below, may utilize one or more rule sets and may utilize rule sets in combination with other parsing techniques, such as specific indications or manual parsing.

In a further aspect, embodiments of the invention provide additional advantages because the results of parsing are directed to identifying and then quoting information from original source content. Thus, parsing and extracting information according to this aspect and embodiment of the present invention can avoid problem encountered in many prior techniques that attempt to translate content or understand underlying meaning. In other words, in embodiments of the present invention, parsing rules are used to identify key content items (such as sentences, names, phrases, images, playable files, or words) from original source content and make those items more easily accessible to a user.

According to further aspects, specific embodiments of the present invention combine aspects of automatic parsing with the data organizing and display paradigm discussed above to give users an efficient and effective method for accessing data from diverse content sources. According to various specific embodiments of the invention, parsing is somewhat related but also some independent from creating categories. According to one embodiment, an important step in parsing a source is creating notes for that source, and during parsing a note will usually be associated with one or more categories.

A wide variety of different specific parsing rules, using known techniques and innovative techniques discussed below, may be employed according to this aspect of the invention. What follows is description of specific parsing techniques that may be advantageously employed to perform automatic note extraction according to the present invention.

3.1. Parsing Based on Sentence Structure and Punctuation

In specific embodiments of the invention, a parsing process uses rules keyed to sentence structure to identify key sentences in a source. By using sentence structure, it is easier to adapt a parsing routine according to the invention to work with different human languages. Work done in conjunction with the present invention also suggests that sentence structure rules provide better results than using semantic rules alone.

In specific embodiments, rules may be built on structural identifiers, such as sentence length, title words, location, commas, semicolons, etc. Rules may also take into account contextual frameworks, key word frequencies, frequencies of proper nouns and numbers, length of the sentence, and the size of the words, etc. In one embodiment, key terms are pulled by indicators such as quotes, identification of proper nouns, abbreviations, parenthesis, etc.

In further specific embodiments, rules may be constructed with a weighting system to evaluate structure, as is known in the art. Weights can be assigned to weighted rules based on any technique known for weighting, including manual determinations or determinations using probabilistic model training (such as Markov Models) as is commonly done in speech recognition and other rules-based systems.

3.2. Source Layout Parsing

In a further aspect, the invention may utilize layout parsing to determine what constitutes the primary text or functions of a page, and what is extraneous or secondary text. Layout parsing, for example, determines what is in an extraneous sidebar, what is part of advertising, what is part of help text, etc. These types of text may not be of interest to a user looking for key or specific content. Today, most search engines do not distinguish between primary and secondary information on a Web page nor between primary and secondary links when spidering or crawling the Web. As a further example of layout parsing, in a particular embodiment, a rule set specifically addresses the difficult problem of determining what is the first and last sentence of the main body of text or what is the beginning and end to the main body of information.

One initial task involved with layout parsing is interpreting the markup language or encoding language in which the document is written (such as HTML, XML, RTML, RTF, MS Word, etc.) to correctly identify information that is of interest for further parsing. This type of parsing must be done by all web browsers to correctly display page content, even those that do not attempt to further extract information on a page.

As a further example, a layout parsing routing may identify links on a news site. The parser will then identify which links are stories on the news site and which are advertisements or other non-news links. To do this, the parser analyses average length of the links and other structural and semantic characteristics to determine the primary links on the site.

A layout parser in a further embodiment also may identify and find search engines on Web sites so that it can automatically perform searches on sites without prompting a user. Similar to finding search forms, the system can find other forms that require user actions such as entering desired plane destinations, address information, etc.

3.3. Example Parsing Rules

Below are examples of parsing rules that may be used in a parsing routine according to specific embodiments of the invention.

3.3.1. Key Sentences (Also Referred to as Key Facts)

In one embodiment of parsing, an important factor in determining a Key Sentence is the writing style of the sentence. For example, one innovative rule according to the present invention predicts that longer or more punctuated structures are more important. In specific embodiments, Key Sentences are indicated by sentence characteristics including such things as: (a) the length of the sentence; (b) the location of the sentence; (c) the length of the page; (d) the number of title words in the sentence; (e) whether the title uses relevant words; (f) the number of words per sentence on average; (g) the number of proper nouns; (h) the number of important words in the sentence; and (i) other structural and language factors. In a specific embodiment, once all of these characteristics of sentences are analyzed and scored, a cumulative importance score for each sentence is determined. Sentences having higher than a particular score may then be included in note set as Key Sentences, arranged in scoring order, or in the same order they were in the original content.

Appropriate particular weighting scores for different characteristics, and appropriate ways of combining weight factors, can be specified manually by a system designer or can be determined or refined using probability analysis (such as Markov Modeling) run on source content with predetermined weighting scores. In various specific embodiments of the invention, sentence-structure parsing rules may have different weights that could change based on such things as: user context or purpose; the classification of site being viewed; etc.

In a further embodiment, other sentence-based categories use the rules for Key Sentences to find the most significant sentence with a further condition, such as, containing a currency symbol or the currency indicating word (for the money category); or a number indication or time indication as discussed below. In various options, sentence designated as a Key Number or Time Frame or Money will not be designated as a Key Sentence, though in other embodiments, a sentence may be included in both categories. In various embodiments of rules sets, Key Sentences scores may be computed for all sentences first and then other sentence rules may be applied. Alternatively, a rule set may look for other sentence categories while identifying Key Sentences.

3.3.2. Key Numbers

Key Numbers are identified from Key Sentences by rules such as that the highest number that contains (in order of priority): (a) a number followed by term billion, million, thousand, hundred; (b) a number followed by % sign, or word "percent"; (c) a number followed by words important in business context, e.g. customers, products, etc.; and (d) any number that isn't in the money or time frame category.

3.3.3. Time Frame

Key Sentences with expressions associated with time spans such as "from to " or words indicating time such as years, days, months, duration, etc., may be associated with a Time Frame category.

3.3.4. Companies

In accordance with further embodiments of the invention, word and phrase-based category notes are identified by reference to databases or indexes of relevant words. Additional syntax based rules, as discussed below, may also be used in the identification and extraction of these notes.

Proper nouns are identified by reference to databases and based on capitalization and other syntax. Proper nouns are examined to analyze if they are a company by checking against a database such as Fortune 2000 companies and/or other business databases. In specific embodiments, the database may gain new entries everyday, as new content is parsed and suspect names are presented to a human operator or other checking routing for addition to the database.

To add to the database of companies, or to flag suspect names for further verification, several rules may be applied to find additional companies. For example, any proper nouns followed by stock ticker symbols may be defined as a company. A further example rule is that a set of proper nouns in a string after the word 'with' may be defined as a company as long as there are also proper nouns before 'with' (which will be defined as a person). Another example is words and proper nouns that end with ".com" will also be defined as companies. The system may look for other statistical indicators of a company using Markov models or other probabilistic analysis and looking at other surrounding words, punctuation, repeats, and location in a sentence.

Markov models are rule dependent and help determine the best scoring systems for maximizing the effect of the rules. The problem of proper noun "organization identification" is a known statistical problem with a number of other techniques identified that may be used in a system according to the current invention.

In a further specific embodiment, a parser can improve on the accuracy of previous methods in this area by classifying sources (as discussed elsewhere herein) and therefore increasing the likelihood of content specific factors important for finding companies. For example, knowing a site is a business news site increases the chances that a suspect word is a company if the word is repeated in an article and article headline, whereas a suspect word repeated in a medical journal in the headline and article is not as likely to be a company.

3.3.5. Products/Services

Proper nouns that are preceded by the word 'the' are sometimes indicators of products and services. In a further example rule, proper nouns that are one word, that are not companies and that are not mentioned within a continual set of proper nouns are highly likely to be products. In a further rule, company names found that have a continuous string of proper nouns following the names are products unless the Company name has 's after it and there are specifically 2 proper nouns following the possessive s (in which case, the name is identified as a person). These rules again may be perfected using Markov statistical models. The invention in a specific embodiment may also use a database of Products and Services.

3.3.6. Key Terms

In a further example, Key Terms may be identified as a word or words that contain: (a) 1, 2 or 3 words in single or double quotes; (b) a proper noun followed by parenthesis containing one or more words or an abbreviation; (c) proper nouns on the page that are repeated more that a determined number of times; (d) bolded or italicized terms; or (e) other factors that determine special terms.

3.3.7. Topics

Paragraph headers, bold text, and numbered headers followed by one or more paragraphs may be parsed into this category. Rules that identify text for this category may take advantage of formatting tags or other information in the original source content, such as HTML tags in HTML text or style identifications in MS Word. These rules also may determine heading information for underlying document structure or formatting. For example, a phrase in a line separated above and/or below by white space from full paragraphs is very likely to be a header or title.

3.3.8. People

Rules identifying notes in this category will link to a database of common people names, famous business people and their titles and companies, politicians and their titles, and celebrities and their titles. Other rules as known in the art may be used to find people. For example, if a proper noun is not a company, product or place, it may be flagged as a likely person. A further example rule is that two proper nouns preceded by the word 'with' will also be listed in the people category. Another example is that two proper nouns followed by 'from' and a company also a person.

As in other categories, rules may be generated or perfected using training data and Markov models to determine a scoring systems for understanding with what certainty a word object is a person. In addition, certain site classifications are more likely to list people and therefore a site classification system according to a further embodiment of the invention can be used to alter the scoring system.

3.3.9. Links

This can be listed as a separate category to go in several types of multiple category templates or be under an optional category called "Details". Words that begin with www or http or underlined words in the middle of the web page (not at the very top or bottom of text, this is usually contact info, etc for the host site) will be listed in this category. The links are analyzed for common length, font size, location and other factors to determine their importance in this category. Links from a page are listed with "page preview" category as a preview default for any Web page.

3.3.10. Other Rules and Other Parsing Features

A rules processor according to the present invention may include a variety of parsing rules, such as the example rules provided, and may also include other rules for syntactic or semantic parsing as known in the art of language parsing. A parsing rule set may be continually augmented by additional rules that may be identified or developed as useful for parsing source material of interest. A parsing rule set may have other rules, included rules that provided for limited translation such as a rule to modify pronouns in extracted sentences so that they are understood. For example, an extracted Key Sentence may read "They [IBM] purchased Lotus for . . . " where "They" is determined by a parsing routine to be "IBM," and "IBM" is therefore added in parenthesis into the extracted note.

While many previous efforts have been directed to automatically parsing computer-encoded information, in this aspect, as will be understood from the teachings provided herein, the present invention provides advantages over previous efforts by using parsing steps that may involve both natural language and layout parsing and that may be performed in an interative fashion, such that some aspects of natural language parsing will help determine the layout parsing and vice versa.

In a further specific embodiment, some parsing tasks may be improved by performing parsing iteratively. Once the parser has identified key sentences, for example, looking for company names inside those key sentences has a higher chance of success.

In a further embodiment, it will be seen from the teachings provided herein that individual notes can each be understood as responses to a "mini-search engines" performed on source content. Each parsing rule is effectively a search engine that extracts specified content from the searched sources. Understanding the rules as small searches suggests additional rules for inclusion in a parsing routine. Thus a category associated with a consumer web site might search for terms such as "rebate" or "lowest price" to return notes relevant to that category.

4. Classifying Websites And Webpages

According to a further aspect of specific embodiments of the invention, content sources (such as Websites) may be assigned to a classification. A classification of a particular website may be used to assist parsing, by providing different parsing rules or different values for weighted rules. A classification of a content source may also determine, or help determine, the categories assigned to notes extracted from that source. According to this aspect of the invention, better and more efficient parsing can be accomplished by having different parsing-rules processing for different classes of content sources. In prior art systems, parsing rules typically are either applied to all sources or different parsing rules are developed for particular sources. In this aspect of this embodiment, the present invention, achieves advantages both of having a few sets of standard parsing rules and of providing rules adapted to particular site types. Assigning content sources to classes aids in further analysis of a page (by natural language and layout parsing) and also may aid in display of a page. According to the invention, it has been found that assigning content source to various classes and then using separate sets of parsing rules for different classes results in more effective parsing of web pages.

In a specific embodiment, classifications include one or more of the following: Industry News, General News, Company Site, Company Overview Site, Commerce Site or Portal, Government Site, Consumer Review Site, Medical Information Site, and Contact Info or Utility Site and others.

In specific embodiments of the invention, content sources are assigned to classes manually, after a review of a content source by a human operator. In alternative embodiments of the invention, a set of classification rules may be employed to aid human review or to automatically classify a website.

In various specific embodiments, structural and semantic frequencies of content may be used to guide or automatically determine a classification for a content source. For example, Company websites often repeat links on home pages and have specific links associated with companies such as "investor relations" and "careers." News sites often have several internal links that are similar in length and are numbered as opposed to titled. E-commerce sites usually have a shopping cart on a high level page. In a similar manner, a classifier according to specific embodiments may use rules to identify site types.

Classification rules may be derived manually or by using training data as will be understood in the art from the teachings provided herein for automatically deriving rules. The classification process identifies several structure and semantic features of these sites/pages and applies probabilities for automatically classifying random pages and sites. It also uses search and reverse search link information.

5. Link Search

According to specific embodiments of the invention, in a further aspect, a link search process will take links from a content document and prioritize them based on various factors, such as the link's position in a document. Links primarily from the main text may be evaluated, in particular embodiments, and may have notes extracted from them and included in a note set for a particular page. For example, a long news story may use a link to access a next page of the story. The Link Search will analyze this link and include the next page of contents in the note set for the source.

In a further embodiment, this aspect of the invention may extract notes from links in a web page or other content to "pre-surf" links provided in a page and can use notes from the extracted links to present additional relevant information to the user.

In this aspect, the invention may crawl the main links on the linked page and continue this process for two or more links deep. In one embodiment, the present invention can go all the way to and past nineteen links or 'generations,' the maximum necessary for the Web according to some studies.

In this aspect, the present invention condenses the link pages and can perform a quick spot check match of the condensed page and gives it a score in order to maximize speed when necessary. The scores are based on any one or more matches of the following: key search terms, related secondary terms based on user purpose as seen in primary facts from the Web page, and matching key facts, key terms, people, and additional specific categories of information of the page in review as compared to the primary content page. The link system may also use similar or the same components used for initial notes searching. The present invention can score the entire Web page or the condensed note taken from the page.

6. Searching Using Categories

In a further embodiment, categories according to the invention may be used for more effective searching. For example, a user may be given the option of selecting in which category their desired information preferentially will be found. According to an embodiment, the a category search routine according to the invention can ill weigh search terms that are found in the indicated categories with higher weights. As discussed above, a user can also view pages one category at a time which is particularly useful and fast for search results. In this embodiment, a system according to the invention leverages its ability to parse only the main content from Web pages and the ability to summarize and categorize extracted notes from returned pages.

6.1. Example of Searching Using Categories According to the Invention

1. User enters key search terms and optionally selects desired category and/or information goal.
2. A search is performed using any known search technologies and source content results are received. In performing the typical search, a search according to the invention may take secondary words it provides and add them the user query.
3. Content results are parsed according to the invention into categorized notes sets.
4. Optionally, categories in notes sets are searched for the user search terms (and optionally secondary terms).
5. A user is provided the top few notes results or results may be collated into folders of similar results. The results may also be collated by site type or as a best mix of all site types.

6. If necessary, user may be asked to make additional clarifications on strong search words. For example a user might be asked further information about the word trunk e.g. Is it an elephant trunk or a car trunk?

It will be understood from the teachings herein that searching combined with the parsing and display features according to the invention allows a user to quickly find specific key facts or specific answers such as market size, etc. Extracted results can be accessed one category at a time which makes finding specific answers across hundreds of pages more quickly.

The present invention has the advantage of displaying its data results on any size screen on any information device. An additional problem the present invention solves is presenting a URL on request to cell phone or other small screen device users. The system works similar to the advanced search engine described above. The system has a URL input form that is similar to the search form. It requests the URL, a search term, and an optional user purpose. The system goes to the requested Web page or site and identifies the page. The system analyses the URL line itself and the pages' contents for structure and for the search term and secondary terms provided by the system based on the user purpose or task. If the page is deemed suitable or usable for presentation, then it is presented. If not, the system searches for a search field on the requested site and automatically enters the user's search term. The results are then Surfnoted and treated similar to the search engine discussed above. If there is no search engine on the page or the system cannot use the search engine, the link engine methods described above are used. The system may use categories of information from different pages within the site to present the user. The system can use a cache of the Website for searching. The system can also use previous URL history requests so that future requests will only require a URL from the user.

The system can also allow a user to enter multiple sites to be searched with the same search word. For example, "new car models" could be a search word entered to be searched on Ford, GM, Honda, and Toyota sites and the top search results from each could be returned.

7. Other Features of Specific Embodiments 7.1. Action Items

Several Websites, such as e-commerce sites, include less text and more activities for the user. In this case, the present invention can mimic or create an alternative interface within the present invention and the present invention can bring its advantages to a Web-based transaction.

Note sets may also include a category called "Actions," which may have notes indicating such actions as "Send Email", "Place Order", or "Initiate Telephone Connection." In a voice contact, a user can elect to switch to a live person using an action category on the note. In addition, a company can allow a user to access either audio or web-based note sets to a user while they are on hold or prompt them to access notes as opposed to talking with a live person. Notes may contain companies' existing 800 numbers or phone numbers as an alternative to URL address names. A system according to this aspect of the invention may using automatic number identification to identify an incoming access device as a telephone (or cell phone). The system may also use its request forms for URLs, searches and news or cell phone cookies to know the original user device and present live website options outside of text or picture data. As discussed above, a system according to the invention may audio play category answers rather than displaying text. The invention facilitates implementing an entire system interface as voice recognition and response because of its abbreviated and organized nature.

7.2. Images and Image Generation

The present invention is capable in specific embodiments of delivering the notes in color and with images from the original Web page. Images are also used for representing text or other content from a page. For example, in a specific embodiment, if the present invention determines that a site contains consumer reviews, the invention can use pattern matching and key words to determine whether the reviews are positive or negative. Then the present invention can take that information and make representative pictures that describes the text. For example, a negative review of a product would show as a thumbs down; a positive review as a thumbs up. Other images can be produced that are based on the categorizations mentioned earlier; those of the site, the user purpose, those of the content within the site, and combinations of all categories.

8. Example Systems According to Various Embodiments of the Invention

From the teachings provided herein, it will be apparent that the invention can be embodied in a wide variety of specific information handling systems. The example systems here describe example components according to particular embodiments of the invention. Other systems, with different components, may also embody the invention.

Figure 14:
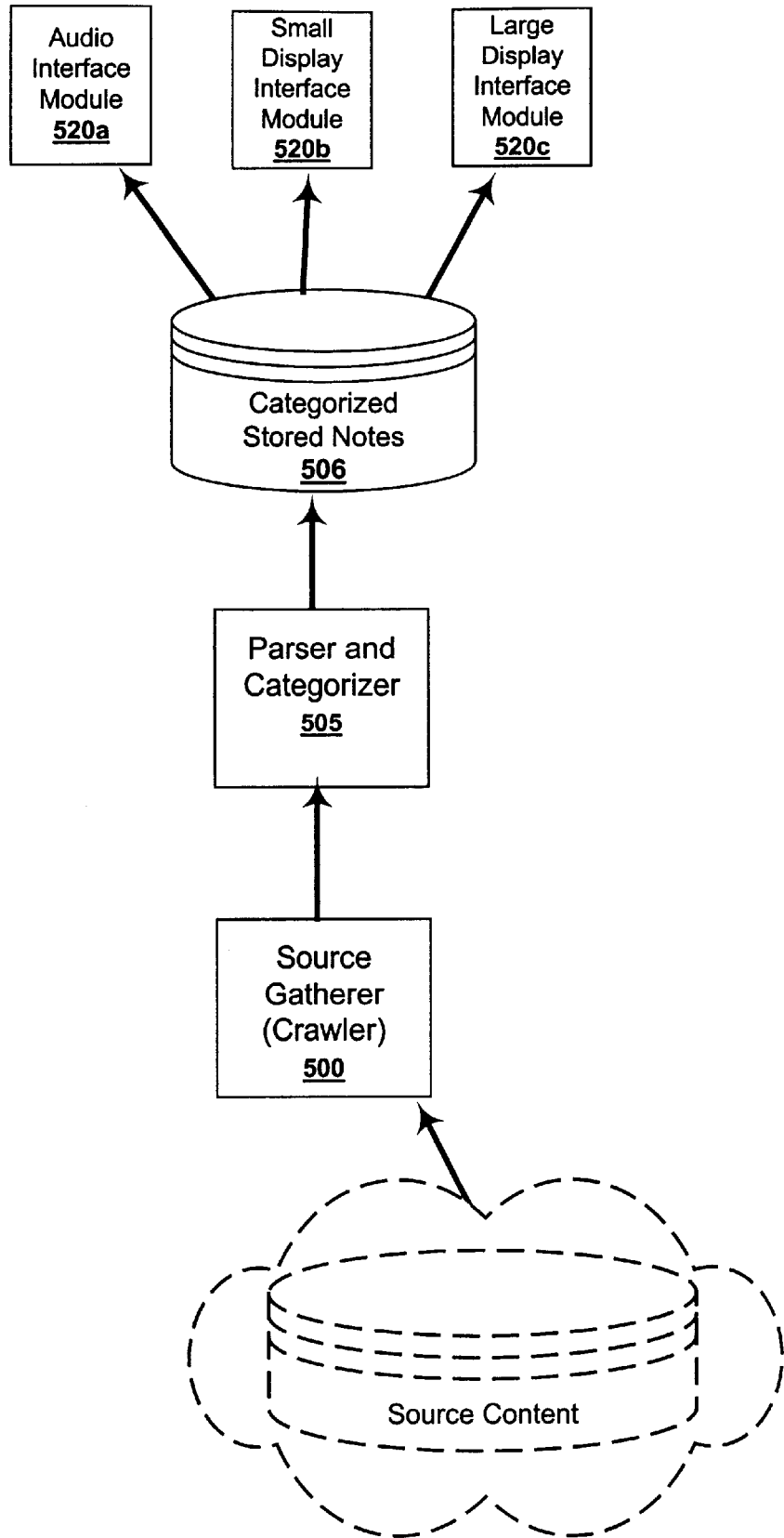
FIG. 14 is a block diagram illustrating an example system implementation according to one embodiment of the present invention.

FIG. 14 is a block diagram illustrating an example system implementation according to one embodiment of the present invention. Illustrate in the figure is an information access module 500, a parser for extracting notes from accessed information 505, storage for extracted and categorized notes 507, optional storage for original source content 510, and a number of interfaces 520 for connecting with users that may be on one or more information devices.

In a standalone embodiment, elements 500–520 may all reside on a single information device, such as a PC. As will be understood from the teachings herein to persons of skill in the art, a PC can include logic modules that can perform the functions of the elements shown in FIG. 14.

In a further embodiment, FIG. 14 can illustrate a system that performs a pre-surfing function on content sources and makes them available to a user. In such a system, 500 can be understood as a information crawling module, such as a web-crawler, for fetching or identify source content according to a set of criteria. This content may then be parsed by 505 into a set of notes, which optionally may be stored at a centralized site for later access in 510. In a wide-area-network implementation, the stored notes 506 may be accessed by remote uses over a communication media (such as a telephone connection or the internet) with different access functionality provided by modules 520 for different types of information appliances.

In either discussed implementation, the operations of 500, 505, and 506 may all take place prior to any specific user request for information communicated via 520. In this embodiment, the invention therefore allows "pre-browsing" and extraction of information sources into more easily accessible notes that can be made available to a user.

As will be understood in the art, the functional block elements shown in FIG. 14 can be variously performed on one or more cooperating computers. A standalone system may reside on one computer that also serves as a user access device. An extensive "web-portal" system may comprise dozens or hundreds of computers cooperatively operating as is known in the art at one or more sites, to provide users the functions illustrated by FIG. 14.

Figure 15:
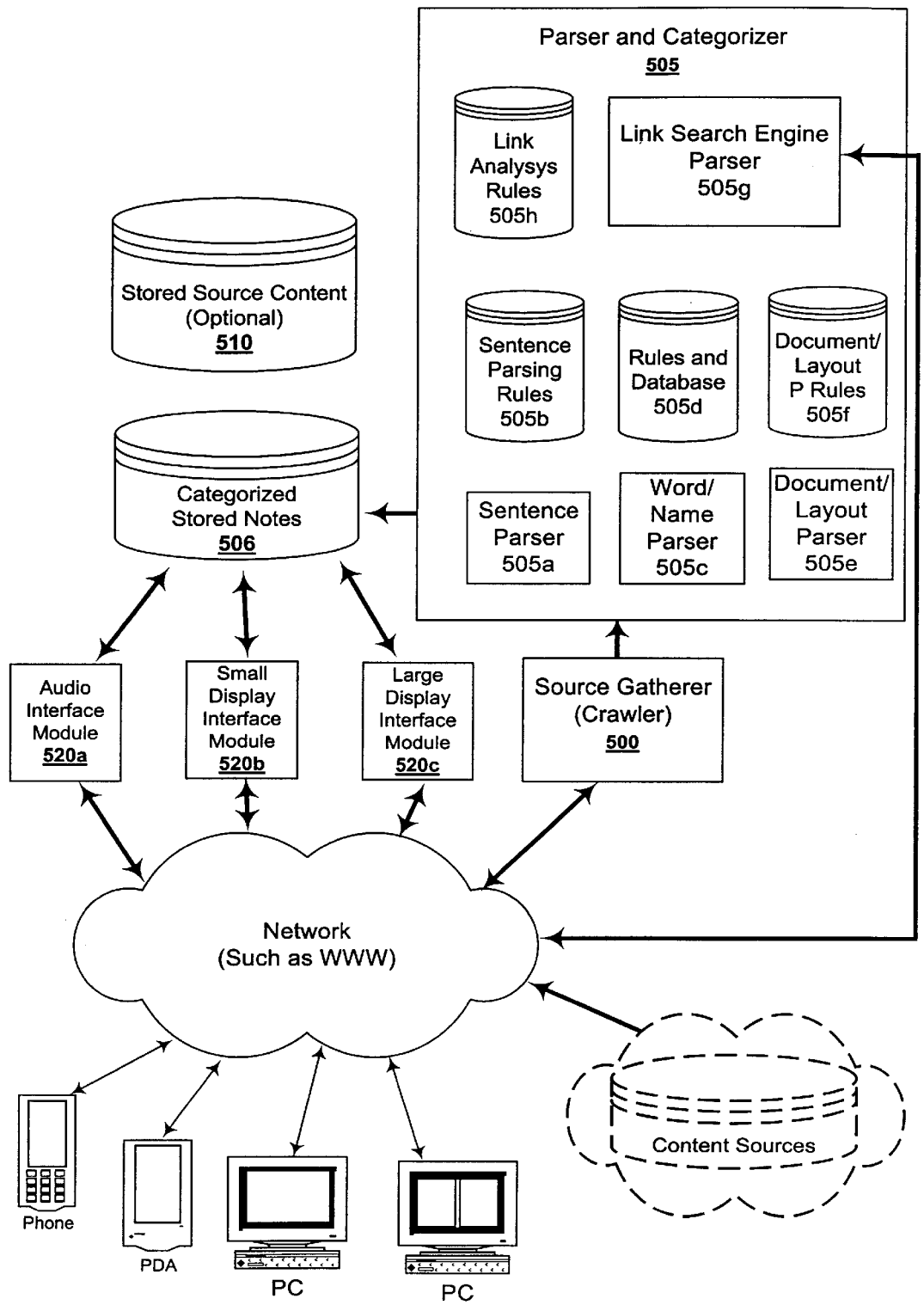
FIG. 15 is a block diagram illustrating an example system implementation with further details according to a further embodiment of the present invention.

FIG. 15 is a block diagram illustrating an example system implementation with further details according to a further embodiment of the present invention. The details shown in FIG. 15 represent just one option for implementing the system shown in FIG. 14. Information access module 500 may be any known or module for performing web crawling, a parser 505 includes a sentence parser 505a, sentence parsing rule sets 505b, word/name parser 505c, word/name rule sets and databases 505d, document/layout parser 505e, document/layout rule sets 505f, link search engine 505g, and link analysis rule set 505h.

In an example pre-surfing system, a few high-interest sites may be selected and grouped into a number of services and content from those sites may be stored in 506. A Web Index and News Service, for example, may find, categorize and deliver information from within online news sites and other news-type Web pages. A Company Insights Service may provide timely worldwide overview of any requested company in notes set format, gathered from a number of sources.

9. Embodiment in a Programmed Information Appliance

Figure 22:
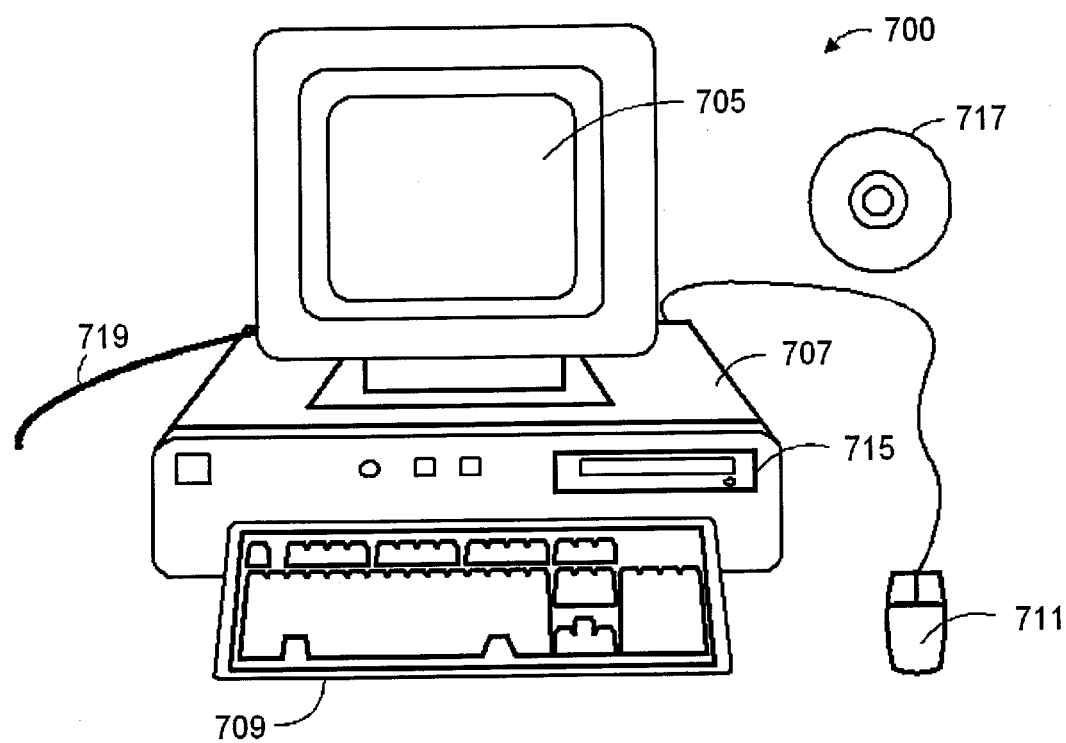
FIG. 22 is a diagram illustrating an example computer device that can embody aspects of the present invention.

FIG. 22 is a diagram illustrating an example computer device that can embody aspects of the present invention. Aspects and embodiments of the present invention can be implemented in hardware and/or software. In some embodiments of the invention, different aspects of the invention can be implemented in either client-side logic or a server-side logic. As will be understood in the art, the invention or components thereof may be embodied in a fixed media (and/or transmissible) program component containing logic instructions and/or data that when loaded into an appropriately configured computing device cause that device to perform according to the invention.

FIG. 22 shows an information appliance (or digital device) 700 that may be understood as a logical apparatus that can read instructions from media 717 and/or network port 719. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717 may be used to program such a system and may represent a disk-type optical or magnetic media, magnetic tape, solid state memory, etc. The invention may be embodied in whole or in part as software recorded on this fixed media. Communication port 719 may also be used to initially receive instructions that are used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language which may be used to create an ASIC or PLD that operates as herein described.

10. Conclusion

The invention has now been explained with regard to specific embodiments. Variations on these embodiments and other embodiments will be apparent to those of skill in the art. The invention therefore should not be limited except as provided in the attached claims. It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A system for converting one or more source documents into summary notes comprising:

a content input for receiving said one or more source documents;

a sentence divider for dividing at least some of said one or more source documents into a plurality of sentences;

a sentence analyzer for identifying key sentences in said one or more source documents and extracting key sentences of said one or more source documents;

a set of possible categories of sentences;

a sentence store for holding categorized sentences extracted from said source documents; and one or more interfaces for providing flexible access to sentences.

2. The system according to claim 1 wherein said one or more source documents comprises one or more documents retrieved by a search engine.

3. The system according to claim 1 wherein said one or more source documents comprises one or more documents retrieved from a network.

4. The system according to claim 1 wherein said one or more source documents comprises a document indicated by a user by reference to a universal resource locator.

5. The system according to claim 1 further comprising:

a link engine able to analyze links in accordance with a set of link analysis rules and to initiate fetching and parsing additional content indicated by links.

6. The system according to claim 1 wherein said system can display data consistently across different sized display screens on different information devices.

7. The system according to claim 1 wherein said system is embodied into a media containing logic instructions that when transmitted into appropriately configured logic device will cause the device to embody said system.

8. The system according to claim 1 wherein said sentence analyzer uses one or more factors in determining which sentences are key sentences, said factors selected from the group comprising:

writing style of a sentence;

length of a sentence;

punctuation level of a sentence;

location of a sentence in a document;

length of a document in which a sentence occurs;

number of words per sentence on average in a document compared with number of words in a sentence;

number of proper nouns in the sentence; and number of words flagged as important words in a sentence.

9. The system according to claim 1 further wherein said sentence analyzer scores characteristics of sentences and determines a cumulative importance score for one or more sentences in a document.

10. The system according to claim 8 further wherein sentences having higher than a particular score may then be included in said store as key sentences.

11. The system according to claim 8 further wherein sentences may be arranged in order by relative score or in the same order said sentences were in the original content.

12. A method of converting one or more source documents into summary notes comprising:

receiving content input of said one or more source documents;

dividing at least some of said one or more source documents into a plurality of sentences;

identifying key sentences in said one or more source documents and extracting key sentences of said one or more source documents;

providing a set of possible categories of sentences;

holding categorized sentences extracted from said source documents in a storage; and providing one or more interfaces for flexible access to sentences.

13. The method of claim 12 wherein said one or more source documents comprises one or more documents retrieved by a search engine.

14. The method of claim 12 herein said one or more source documents comprises one or more documents retrieved from a network.

15. The method of claim 12 wherein said one or more source documents comprises a document indicated by a user by reference to a universal resource locator.

16. The method of claim 12 further comprising:

analyzing links in accordance with a set of link analysis rules and to initiate fetching and parsing additional content indicated by links.

17. The method of claim 12 further comprising:

using one or more factors in determining which sentences are key sentences, said factors selected from the group comprising:

writing style of a sentence;

length of a sentence;

punctuation level of a sentence;

location of a sentence in a document;

length of a document in which a sentence occurs;

number of words per sentence on average in a document compared with number of words in a sentence;

number of proper nouns in the sentence; and number of words flagged as important words in a sentence.

18. The method of claim 12 further comprising:

scoring characteristics of sentences and determining a cumulative importance score for one or more sentences in a document.

19. The method of claim 12 further comprising:

storing sentences having higher than a particular score as key sentences.

20. A system for converting one or more source documents into summary notes comprising:

means for receiving content input of said one or more source documents;

means for dividing at least some of said one or more source documents into a plurality of sentences;

means for identifying key sentences in said one or more source documents and extracting key sentences of said one or more source documents;

means for providing a set of possible categories of sentences;

means for holding categorized sentences extracted from said source documents in a storage; and means for providing one or more interfaces for flexible access to sentences.

* * * * *